United States Patent
Budde (10) Patent No.: US 10,491,034 B2
(45) Date of Patent: Nov. 26, 2019

(54) SYSTEM AND METHODS OF GRID STABILIZATION

(71) Applicant: SCHNEIDER ELECTRIC IT CORPORATION, West Kingston, RI (US)

(72) Inventor: Kristian Budde, Kolding (DK)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 688 days.

(21) Appl. No.: 15/108,914

(22) PCT Filed: Dec. 31, 2013

(86) PCT No.: PCT/US2013/078414
§ 371 (c)(1),
(2) Date: Jun. 29, 2016

(87) PCT Pub. No.: WO2015/102597
PCT Pub. Date: Jul. 9, 2015

(65) Prior Publication Data
US 2016/0322861 A1    Nov. 3, 2016

(51) Int. Cl.
*H02M 7/04* (2006.01)
*H02J 9/06* (2006.01)
(Continued)

(52) U.S. Cl.
CPC ............ *H02J 9/061* (2013.01); *H02J 7/0052* (2013.01); *H02M 1/4208* (2013.01); *H02M 3/04* (2013.01);
(Continued)

(58) Field of Classification Search
CPC ........................................................ H02J 9/061
See application file for complete search history.

(56) References Cited

U.S. PATENT DOCUMENTS 5,229,651 A    7/1993  Baxter, Jr. et al.
5,329,222 A    7/1994  Gyugyi et al.
(Continued)

FOREIGN PATENT DOCUMENTS

CN    1281290 A    1/2001
CN    102835003 A    12/2012
(Continued)

OTHER PUBLICATIONS

Notification of Transmittal of the International Search Report and the Written Opinion of the International Searching Authority from corresponding PCT/US2013/078414 dated May 12, 2014.
(Continued)

*Primary Examiner* — Hai L Nguyen
(74) *Attorney, Agent, or Firm* — Lando & Anastasi, LLP (57) ABSTRACT

According to various aspects and embodiments, a power device is provided. The power device includes an input configured to receive input power, and a controller coupled to the input. The controller is configured to sample a voltage waveform of the input power, compare the sampled voltage waveform with a sinusoidal reference waveform to determine a plurality of offset values, and shape an input current waveform of the power device to be substantially similar to the voltage waveform based on the plurality of offset values.

19 Claims, 7 Drawing Sheets

(51) Int. Cl.
*H02M 1/42* (2007.01)
*H02J 7/00* (2006.01)
*H02M 3/04* (2006.01)
*H02M 7/44* (2006.01)

(52) U.S. Cl.
CPC ............... *H02M 7/04* (2013.01); *H02M 7/44* (2013.01); *Y02B 70/126* (2013.01)

(56) References Cited

U.S. PATENT DOCUMENTS

| | | |
|---|---|---|
| 5,579,197 A | 11/1996 | Mengelt et al. |
| 5,642,300 A | 6/1997 | Gubisch et al. |
| 6,693,409 B2 | 2/2004 | Lynch et al. |
| 6,944,034 B1 | 9/2005 | Shteynberg et al. |
| 7,239,043 B2 * | 7/2007 | Taimela ............. H02M 1/4208 307/66 |
| 7,550,873 B2 | 6/2009 | Jiang et al. |
| 7,566,988 B2 | 7/2009 | Heber et al. |
| 7,948,118 B2 * | 5/2011 | Chambon ............... H02J 9/005 307/66 |
| 8,305,051 B2 | 11/2012 | Phadke et al. |
| 8,552,589 B2 | 10/2013 | Ghosh et al. |
| 8,791,597 B2 | 7/2014 | Chen |
| 8,946,931 B2 | 2/2015 | Jayaraman et al. |
| 9,203,244 B2 | 12/2015 | Abe |
| 2003/0016548 A1 | 1/2003 | Tassitino et al. |
| 2003/0035308 A1 | 2/2003 | Lynch et al. |
| 2004/0085785 A1 | 5/2004 | Taimela |
| 2005/0141157 A1 | 6/2005 | Okayama et al. |
| 2005/0270813 A1 | 12/2005 | Zhang et al. |
| 2005/0275976 A1 | 12/2005 | Taimela et al. |
| 2006/0238143 A1 | 10/2006 | Uematsu et al. |
| 2008/0088183 A1 | 4/2008 | Eckroad et al. |
| 2008/0278005 A1 | 11/2008 | Chambon |
| 2009/0184582 A1 | 7/2009 | Hwang |
| 2009/0237963 A1 | 9/2009 | Prasad et al. |
| 2010/0006551 A1 | 1/2010 | Geissler et al. |
| 2012/0248874 A1 | 10/2012 | Pan et al. |
| 2012/0302112 A1 | 11/2012 | Hartig et al. |
| 2013/0162049 A1 | 6/2013 | Morati et al. |
| 2015/0084423 A1 | 3/2015 | Gamborg |
| 2015/0333566 A1 | 11/2015 | Berard |

FOREIGN PATENT DOCUMENTS

| | | |
|---|---|---|
| JP | H11289668 A | 10/1999 |
| WO | 2004054065 A1 | 6/2004 |
| WO | 2010036974 A2 | 4/2010 |
| WO | 2014041390 A1 | 3/2014 |
| WO | 2014107169 A1 | 7/2014 |

OTHER PUBLICATIONS

Yang X et al: "Shore to ship converter system for energy saving and emission reduction", Power Electronics and ECCE Asia (ICPE &ECCE), 2011 IEEE 8th International Conference on, IEEE, May 30, 2011 (May 30, 2011), pp. 2081-2086, XP031956118, DOI: 10.11 09/ICPE.2011.5944522, ISBN: 978-1-61284-958-4.

Extended European Search Report from corresponding European Application No. 13900796.7 dated Jul. 10, 2017.

* cited by examiner

SYSTEM AND METHODS OF GRID STABILIZATION

CROSS-REFERENCE TO RELATED APPLICATIONS

This application is a U.S. National Stage Application under 35 U.S.C. § 371 of International Application No. PCT/US2013/078414, filed Dec. 31, 2013, titled SYSTEM AND METHODS OF GRID STABILIZATION, which is hereby incorporated herein by reference in its entirety.

BACKGROUND

Technical Field

Embodiments of the present disclosure relate generally to power management, and more particularly, to dynamic adjustment of input current of a power device coupled to a grid.

Background Discussion

The world-wide demand for power has increased, and as a result, power grids increasingly include distributed power generation. For example, renewable sources (e.g., photovoltaic) and other micro grid inverters have increased complexity in combined grid infrastructure. In addition, an increased demand has lead to a number of loads connected to power grids which adversely affect the quality of power delivered by the power grid due to the introduction of harmonic components by the loads. Such distortion in voltage waveforms contribute to line losses, equipment damage, increased power costs, and wasted energy.

SUMMARY

According to some embodiments, a power device is provided. The power device includes an input configured to receive input power, and a controller coupled to the input. The controller is configured to sample a voltage waveform of the input power, compare the sampled voltage waveform with a sinusoidal reference waveform to determine a plurality of offset values, and shape an input current waveform of the power device to be substantially similar to the voltage waveform based on the plurality of offset values.

In the power device, each offset value of the plurality of offset values may include a difference between a sample of the sampled voltage waveform and a corresponding sample of the sinusoidal reference waveform, and the controller may be further configured to compare each offset value of the plurality of offset values to a corresponding entry in a reference table, and update at least one entry in the reference table based on an offset value. In one embodiment, at least a fraction of the offset value is added to the at least one entry based on a configurable adaption speed parameter.

In the power device, the controller may be further configured to determine a plurality of target current values based on summing each entry in the reference table with a corresponding sample of the sinusoidal reference waveform. In one embodiment, each target current value of the plurality of target current values is adjusted based on a configurable weighting parameter.

In the power device, the controller may include an inductive filter, and wherein the controller is further configured to adjust each target current value of the plurality of target current values using the inductive filter.

In one embodiment, the power device is configured to draw each target current of the plurality of target current values over a first period of the input power. In this embodiment, at least one target current value of the plurality of target current values may be adjusted based on the configurable adaption speed parameter between the first period and a second period of the input power.

In one embodiment, the power device comprises an uninterruptable power supply (UPS).

According to another embodiment, a method for shaping an input current waveform of a power device is provided. The method includes acts of sampling a voltage waveform of an input power, comparing the sampled voltage waveform with a sinusoidal reference waveform to determine a plurality of offset values, and shaping the input current waveform to be substantially similar to the voltage waveform based on the plurality of offset values.

The method may further include acts of comparing each offset value of the plurality of offset values to a corresponding entry in a reference table, and updating at least one entry in the reference table based on an offset value. In one embodiment, the act of updating at least one entry in the reference table based on the offset value includes adding at least a fraction of the offset value to the at least one entry based on a configurable adaption speed parameter.

The method may further include an act of determining a plurality of target current values based on summing each entry in the reference table with a corresponding sample of the sinusoidal reference waveform. In one embodiment, the act of determining the plurality of target current values based on summing each entry in the reference table with the corresponding sample of the sinusoidal reference waveform further includes adjusting each target current value of the plurality of target current values based on a configurable weighting parameter. In another embodiment, the act of determining the plurality of target current values based on summing each entry in the reference table with the corresponding sample of the sinusoidal reference waveform further includes filtering each target current value of the plurality of target current values using an inductive filter.

In the method, the act of shaping the input current waveform to be substantially similar to the voltage waveform based on the plurality of offset values may further include drawing each target current of the plurality of target current values over a period of the input power.

According to another embodiment, a power device is provided. The power device includes an input configured to receive input power, a controller coupled to the input, and means for progressively shaping an input current waveform of the power device to be substantially similar to a voltage waveform of the input power over at least two periods of the input power.

In one embodiment, the means is configured to shape the input current based on a configurable adaption speed parameter. In another embodiment, the means is configured to shape the input current based on a configurable weighting parameter.

In one embodiment, the means for shaping an input current waveform of the power device includes an inductive filter.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "an other embodiment," "some embodiments," "other embodiments,"

"an alternate embodiment," "various embodiments," "one embodiment," "at least one embodiments," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

Furthermore, in the event of inconsistent usages of terms between this document and documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment.

The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, the quality of power from a power grid may be adversely affected by how power is generated and by loads on the power grid. In particular, loads on the grid having non-unity power factor may result in the generation of harmonic components on the grid According to some embodiments, grid power quality may be increased by reducing demand on the grid during periods where the grid is expected to be loaded the most and opposite where the grid is expected to be loaded the least. By adapting the sinusoidal input current waveform of devices on the power grid to a shape matching the grid voltage shape, voltage distortion may be suppressed and the grid voltage waveform may be stabilized. Power devices including UPSs configured according to aspects and embodiments herein may be configured to intelligently increase or decrease current drawn from the power grid to effectively shape their sinusoidal input current and improve the combined power factor (PF) of the power grid resulting in the reduction of harmful harmonic components on the grid.

Although conventional uninterruptable power supplies (UPS) are primarily designed to provide backup power (e.g., from a battery) when the utility power is poor or unavailable, a UPS, according to one embodiment, may be configured to actively adapt its load and adjust the shape of its sinusoidal input current waveform based on the quality of the voltage waveform of the grid. By operating the UPS in this manner, the UPS can be used not only as a source of high-quality backup power, but also as an active participant in decreasing voltage distortion in a power grid. Moreover, by operating a plurality of parallel connected UPS devices in this manner, the power quality of the grid may be effectively controlled in a decentralized fashion.

Figure 1:
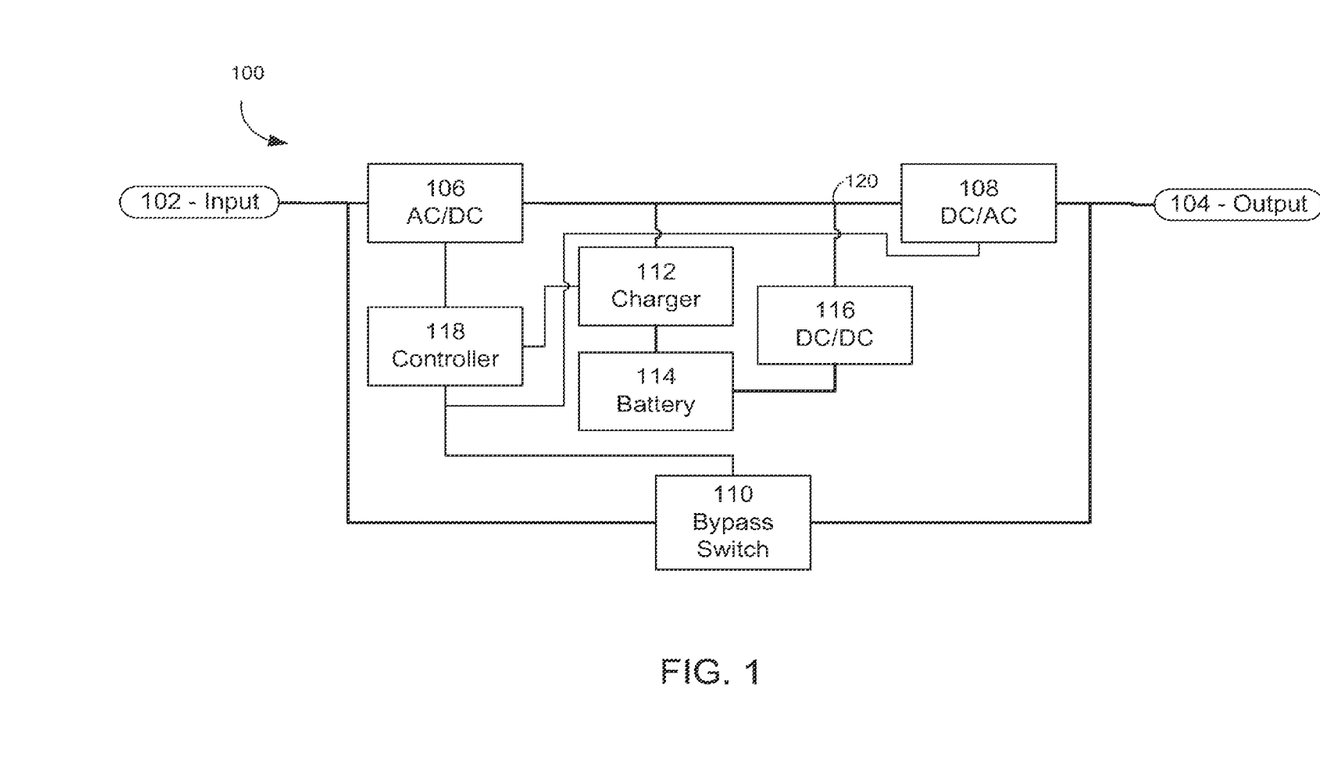
FIG. 1 is a block diagram of an uninterruptable power supply (UPS)

FIG. 1 illustrates an example UPS 100 constructed to receive power from an external source and provide output power to a load. The UPS 100 includes an input 102, an output 104, a bypass switch 110, an AC/DC rectifier 106, a DC bus 120, a DC/AC inverter 108, a battery charger 112, a battery 114, a DC/DC converter 116, and a controller 118.

The input 102 is constructed to connect to a grid to receive power from an external AC power source such as a utility power source. The input 102 is coupled to the AC/DC rectifier 106 that converts the input AC power to DC power and controls the power factor of the UPS based on control signals received from the controller 118. The input 102 is also selectively coupled to the output 104 via the bypass switch 110. The output 104 is constructed to output AC power to a load. The UPS may be constructed to receive via input 102 and output via output 104 single-phase AC power or three-phase AC power.

The AC/DC rectifier 106 is also coupled to the DC/AC inverter 108 via the DC bus 120. The battery 114 is coupled to the DC bus 120 via the battery charger 112 and also to the DC bus 120 via the DC/DC converter 116. The controller 118 is coupled to the AC/DC rectifier 106, the DC/AC inverter 108, the bypass switch 110, the battery charger 112, and the DC/DC converter 116. In other embodiments, the battery 114 and the charger 112 may be coupled to the AC/DC rectifier 106.

In one embodiment, the UPS 100 is configured to operate in one or more modes of operation based on the quality of the AC power received from the utility source. In this embodiment, the controller 118 monitors the AC power received from the utility source at the input 102 and, based on the monitored AC power, sends control signals to the bypass switch 110, the battery charger 112, the AC/DC rectifier 106, the DC/AC inverter 108, and the DC/DC converter 116 to control operation of the UPS 100. The UPS modes of operation may include, for example, a bypass mode, an online mode, and a battery mode. In online mode, the bypass switch 110 is off and the input power received at the input 102 is rectified in the AC/DC rectifier 106 and inverted in the DC/AC inverter 108 before reaching the output 104. A portion of the power received at the input port may be used to charge the battery 114 via the charger 112. In bypass mode, the UPS 100 directly couples the input 102 to the output 104 via the bypass switch 110. In battery mode, the UPS 100 draws power from the battery 114 via the DC/DC converter 116 to supplement and/or replace the power received at the input 102.

In at least one embodiment, the controller 118 may monitor power from the power grid received at the input 102 to determine a grid voltage waveform. In this embodiment, the controller 118 monitors the input voltage waveform, and, based on the shape of the input voltage waveform, sends control signals to the AC/DC rectifier 106 and the battery charger 112 to change the amount of current drawn at different intervals. In one embodiment, the portion of the current that would normally go to the battery may be increased or decreased when desirable to compensate for grid distortion.

In some embodiments, the controller 118 may be implemented in hardware or a combination of hardware and software. Controller 118 may take a variety of forms dependent upon the specific application and processes used to perform the shaping of an input current waveform and to control other operations of the UPS 100. One example input current waveform shaping process is described below with reference to FIG. 6. In one embodiment, the input current waveform shaping process is be executed by controller 118, or any computer system communicatively connected to the UPS 100, such as the computer system 700 described below with reference to FIG. 7.

Although various embodiments and examples discussed herein relate to grid stabilization using a UPS, embodiments are not limited for use in UPSs and may be used with other power systems and devices generally. In addition, although various embodiments include references to a single-phase power source, it should be understood that two-phase and three-phase power sources are compatible with aspects and embodiments of the present disclosure. Further, while the UPS of FIG. 1 is an online UPS, other embodiments may be directed to off-line UPSs, line-interactive UPSs, or any other type of UPS.

Figure 2:
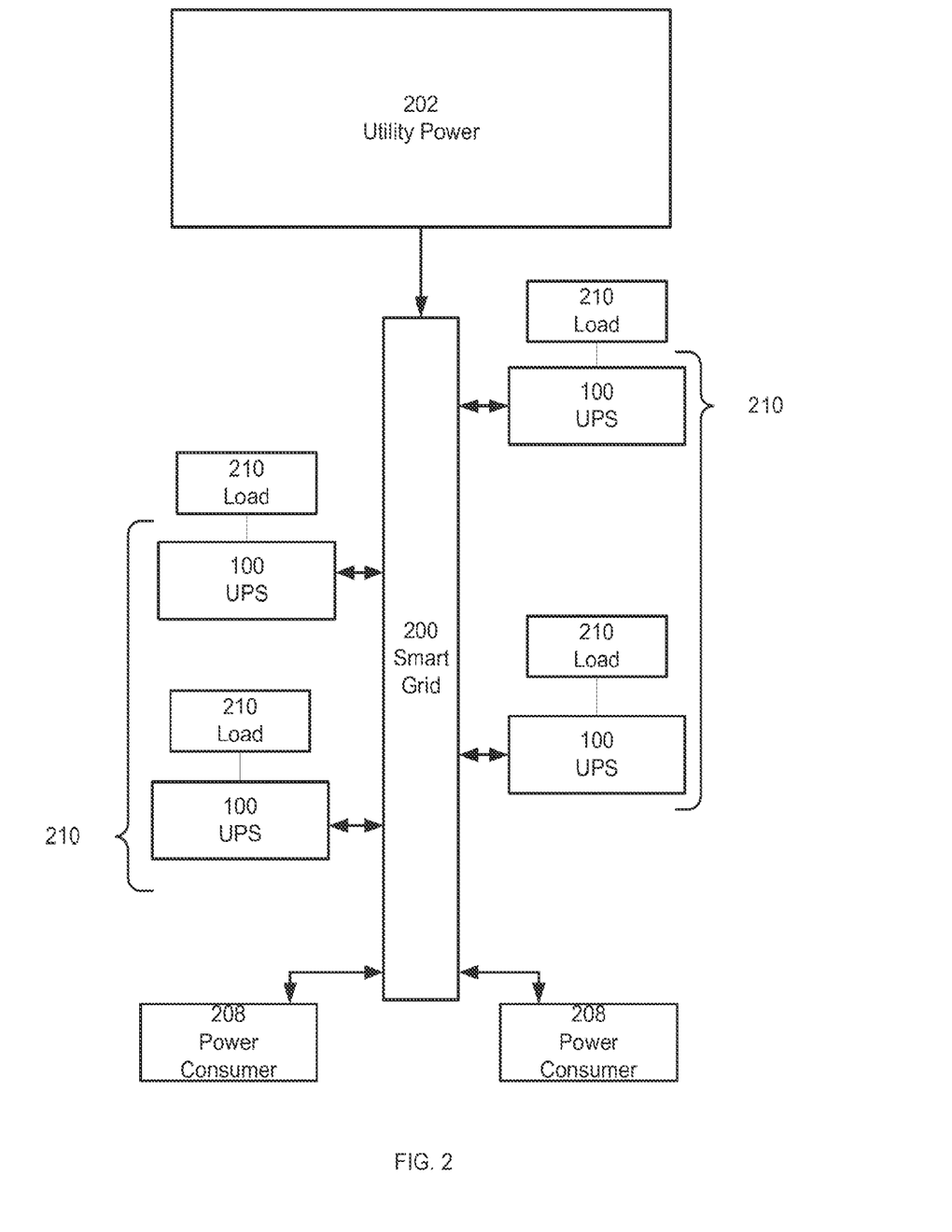
FIG. 2 is a block diagram of a smart grid including at least one UPS of FIG. 1.

FIG. 2 is a block diagram of a smart grid 200 according some aspects and embodiments disclosed herein. The smart grid 200 receives AC utility power 202 from a power supply, for example, from AC mains or from an on-site generator. A plurality of devices 210 are coupled to the smart grid 200 and are configured to receive input power. In addition, each device of the plurality of devices 210 is coupled to and configured to provide current to a load 210. Likewise, a plurality of power-consuming devices 208 (i.e., loads) are coupled to the smart grid 200 and configured to receive input power. In the embodiment shown, the plurality of devices 210 are UPS devices configured identically to the UPS 100 of FIG. 1.

As discussed above, because the total load connected to the smart grid may vary significantly, there may be times during which part of a sinusoidal period of the utility power 202 is loaded more heavily compared to other periods causing distortion in the grid voltage. The distortion of the voltage waveform may increase the risk of a UPS or other power-consuming equipment tripping out (e.g., switching to battery power, or tripping a circuit breaker), and potentially shortening life expectancy of power equipment (e.g., by thermal stress).

According to one aspect of the disclosure, a plurality of devices, such as the plurality of devices 210, may draw current in a manner which shapes their input current waveform to that of the grid voltage waveform to reduce the distortion on the grid. In one embodiment, each device of the plurality of devices 210 may be a small consumer of power on the smart grid 200. However, a plurality of these devices shaping their input current waveform to match the grid voltage waveform may contribute to the overall quality of the power supplied by the smart grid 200 by collectively suppressing voltage distortion. In one embodiment, the decision to adjust an input current waveform shape may be made by each power device independently. As discussed below, each power device of the devices 210 may be configured with configurable parameters that determine adaption speed and weighting of adjustments made to an input current waveform.

Figure 3:
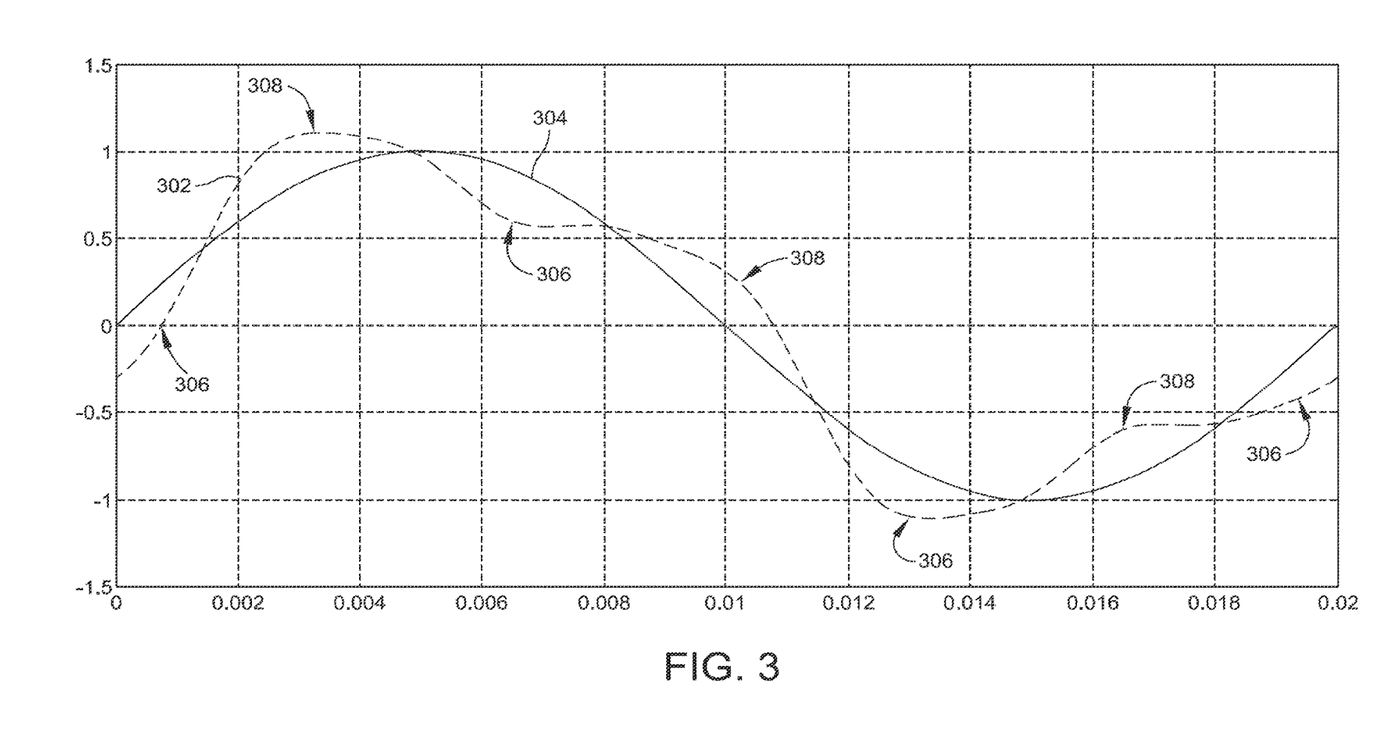
FIG. 3 is a diagram illustrating one example of a grid voltage waveform in relation to a sinusoidal reference current waveform.

In one embodiment, a power device may be configured to compare a grid voltage waveform to a generated sinusoidal reference waveform. Offsets between the grid voltage waveform and the sinusoidal reference waveform may be determined, stored, updated, and utilized to shape an input current of the power device. FIG. 3 is one example of a grid voltage waveform 302 in relation to a sinusoidal reference waveform 304. In one embodiment, the power device, such as the UPS 100 of FIG. 1, may determine the difference between the grid voltage waveform 302 and the sinusoidal reference waveform 304 over one period. In this embodiment, the power device may sample the grid voltage waveform 302 at a rate sufficient to capture a complete set of samples over one full period. For example, a 10 kHz sampling rate may be utilized resulting in a 60 Hz grid being sampled 166 times (10 kHz/60 Hz=166) for each sinusoidal period. The grid voltage waveform 302 may then be compared to the sinusoidal reference waveform 304 to determine the presence of harmonic content (e.g., as a result of non-linear loading).

In the embodiment shown, the grid voltage waveform 302 is periodically below the sinusoidal reference current waveform 304 at intervals 306, and above the reference current waveform 304 at intervals 308. These intervals where the grid voltage waveform 302 is offset from the sinusoidal reference current waveform may indicate unbalanced, or non-linear, loading. For example, at the intervals 306, the grid may be delivering a large amount of current. In one embodiment, at each interval the grid voltage waveform 302 is sampled and compared to a corresponding sample of the reference current waveform 304 to determine an offset. As discussed below, these offsets may be stored by the power device in a reference table in a memory of the power device and used to shape the input current waveform of the power device.

Figure 4:
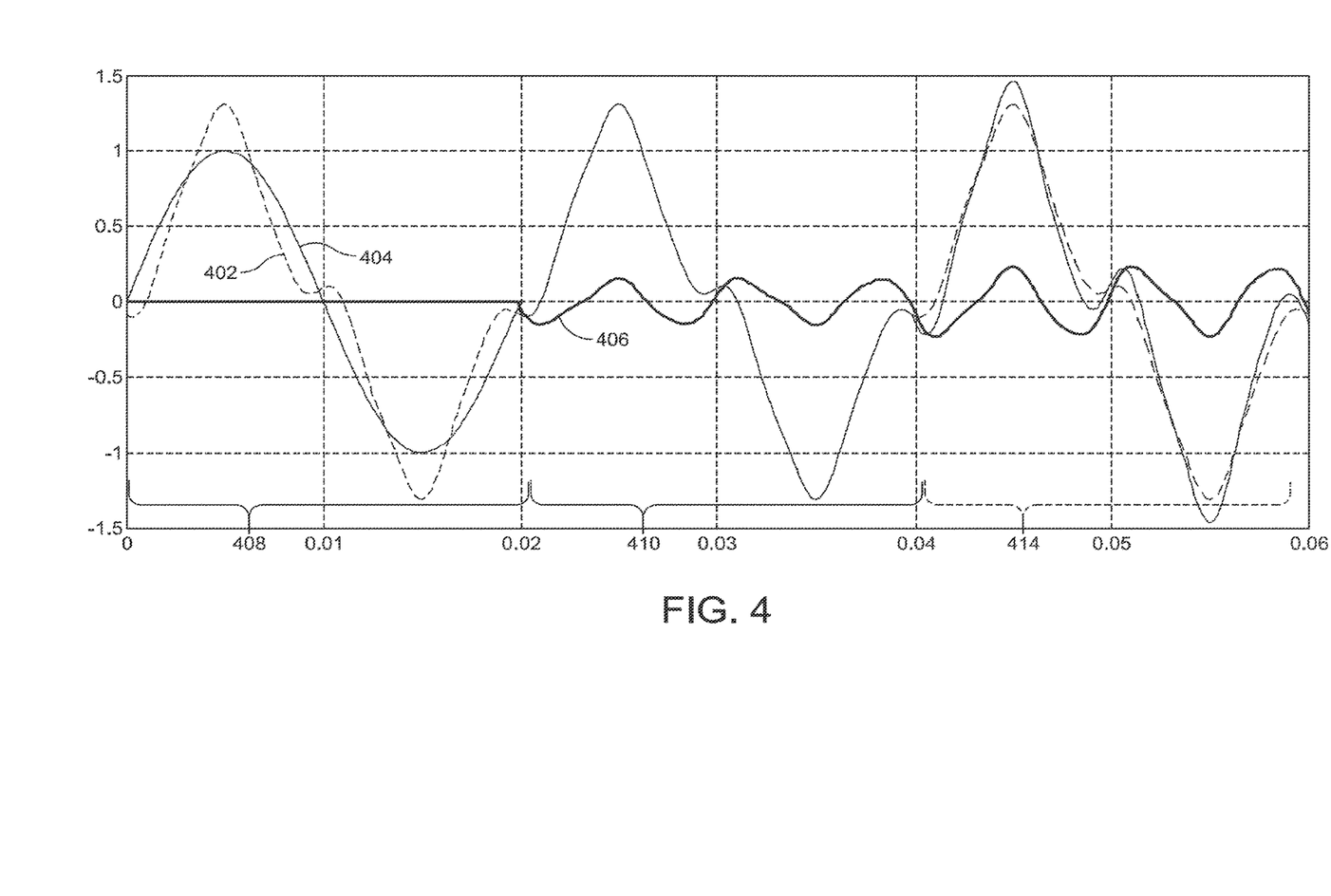
FIG. 4 is a diagram illustrating one example of an input current waveform of the UPS of FIG. 1.

FIG. 4 is a diagram illustrating one example of an input current waveform 404 reshaped over several periods to match a grid voltage waveform. In the embodiment shown, the differences (e.g., offsets) between a grid voltage waveform 402 and a sinusoidal reference waveform (not shown) are determined over a first period 408, a second period 410, and subsequent periods 414. In the embodiment shown, the offsets are illustrated as reference values 406. During the first period 408, the reference values 406 may be zero and/or undefined until one or more periods have elapsed allowing the grid voltage waveform 402 and the sinusoidal reference waveform to be compared. During subsequent periods (e.g., the second period 410, and the subsequent periods 414), the reference values 406 may be adjusted based on differences between the grid voltage waveform 402 and the sinusoidal reference waveform. As a result, the reference values 406 may include harmonic content of the grid voltage waveform. A process, such as the process 600 of FIG. 6, may use the reference values 406 to mitigate or effectively suppress harmonics on the grid through reshaping of the power device's input current waveform. The speed at which the reference values 406 are updated to include the full extent of the offsets, or grid errors, determines how fast the input current waveform 404 will be reshaped. As discussed below, it may be desirable to update the reference values 406 incrementally over several periods (i.e., more slowly) to avoid the potential of overshoot when reshaping the input current waveform 404.

In one embodiment, the reference values 406 are updated and applied based on configurable parameters. For example, an adaption speed parameter may be utilized when updating the reference values 406. In this example, the adaption speed parameter determines how fast the shape of the input current waveform 404 is adjusted. As discussed above, the closer the reference values 406 are to the actual offsets, or errors, of the grid voltage waveform the faster the shaping. In the embodiment shown, the adaption speed parameter is configured at the maximum speed (e.g., a multiplier of 1.0) which causes the input current waveform 404 to be reshaped identically to that of the grid voltage waveform 402 by the second period 410. In other embodiments, the adaption speed parameter may be configured to more slowly reshape the input current waveform 404 over several periods to mitigate the potential of overshoot, and potentially avoid further distortion of the grid voltage waveform 402. In other examples, a weighting parameter may be utilized when adjusting the input current waveform 404. As discussed below with reference to FIG. 6, the weighting (gain) parameter may allow for finer adjustments to the shape of the input current waveform 404.

Figure 5:
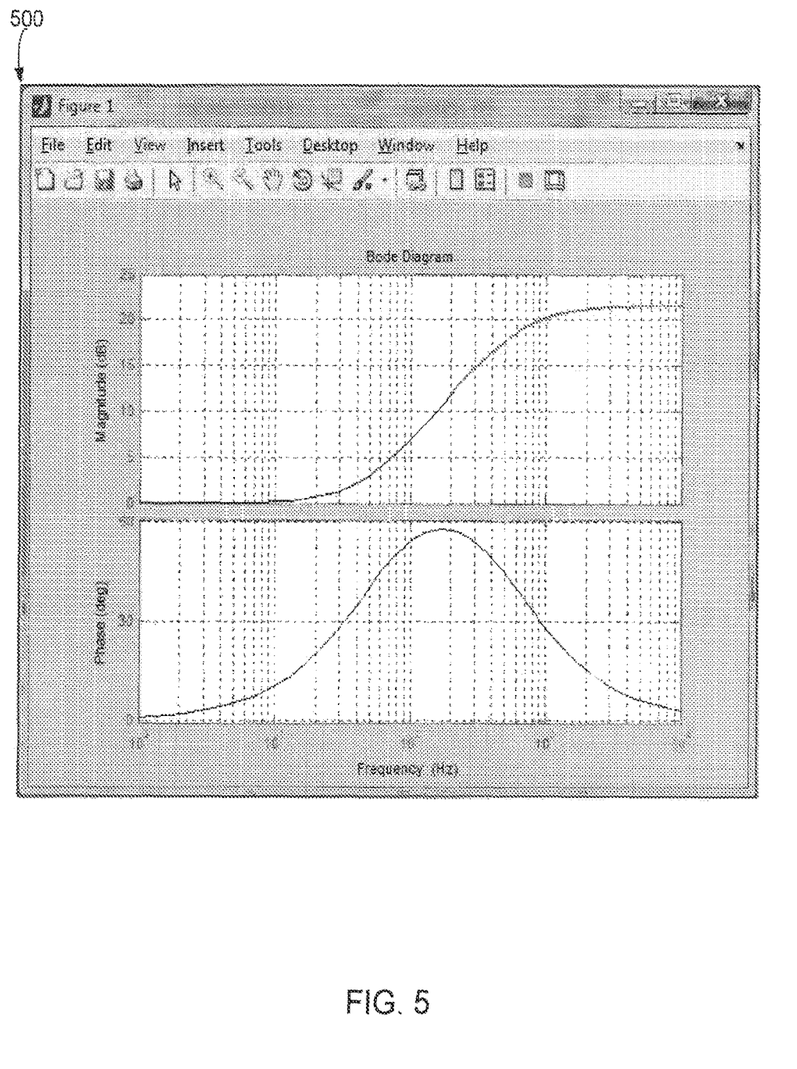
FIG. 5 is a diagram illustrating one example of a bode plot for an inductive filter.

In some embodiments, a large power device (e.g., a UPS) is more likely to behave inductively rather than resistively. In these embodiments, it may not be optimal to directly shape an input current waveform based on the reference values 406. Instead, a first order filter may be utilized to compensate for the inductive behavior. FIG. 5 is a diagram illustrating one example of a bode plot 500 for one such filter. In the embodiment shown, the bode diagram 500 illustrates an inductive filter using a power grid frequency (e.g., 50 Hz) and the 2*7' harmonic as a location for zero and pole. As discussed below with reference to FIG. 6, a power device may pass the reference values 406 through an inductive filter prior to shaping an input current waveform to account for a large power device's inductive behavior.

Figure 6:
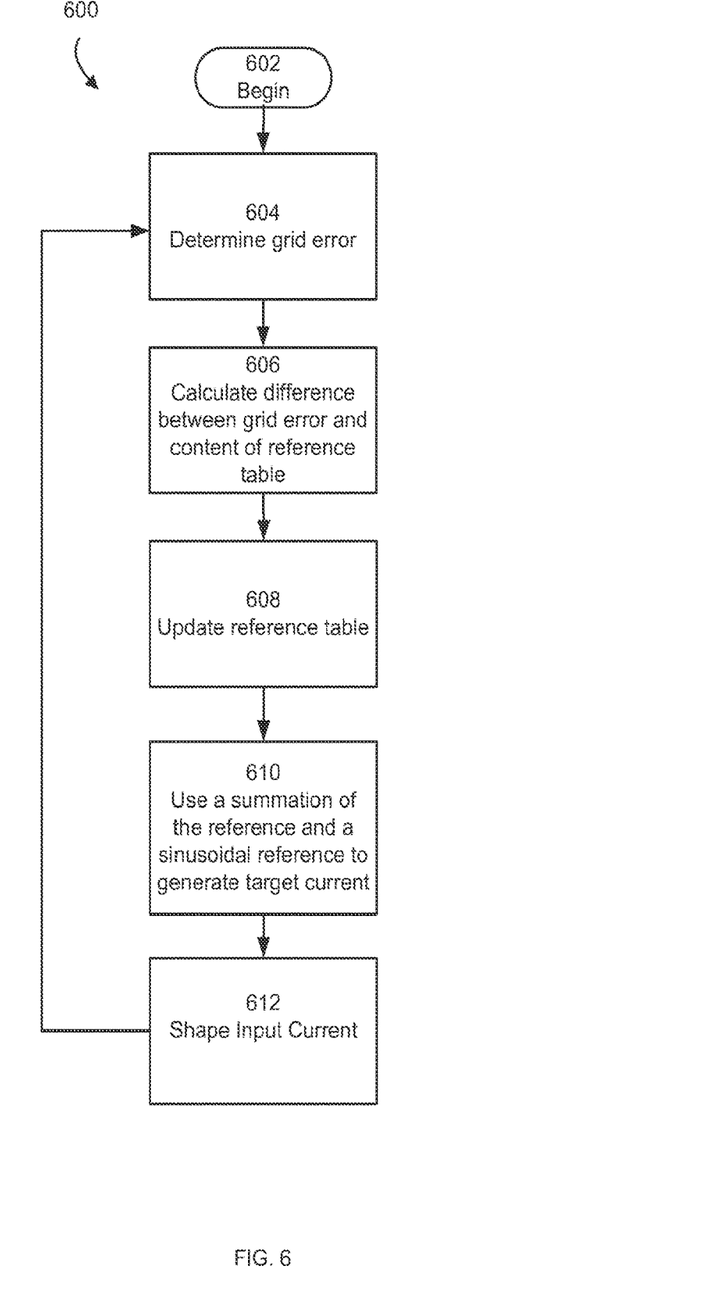
FIG. 6 is a flow diagram of one example of a method for shaping an input current waveform.

As described above with reference to FIG. 1, some embodiments control an input current waveform to reduce voltage distortion of power devices in a power grid. FIG. 6 illustrates one example input current waveform shaping process performed by a power device, such as the UPS 100 of FIG. 1. The process 600 may, for example, be serviced by an interrupt on the controller 118 within the power device. The process 600 begins in act 602.

In act 604, the power device samples a grid voltage waveform and determines offsets between the grid voltage waveform and a sinusoidal reference waveform. In one embodiment, each offset may be determined based on a percentage of error between a sample of the grid voltage waveform and a sample of the sinusoidal reference waveform. The difference may be referred to as grid error (or grid distortion) herein.

In act 606, each offset is compared to a reference value in a reference table. In one embodiment, each offset is converted into a current value. In this embodiment, the offset (e.g., the percentage of error) is the difference between the sampled grid voltage waveform and an ideal current waveform, i.e., the sinusoidal reference waveform. The offset may be multiplied by a current value of the corresponding sample from the sinusoidal reference waveform to determine a current offset. The resulting current offset may then be compared and used to update an entry in the reference table.

In act 608, one or more entries of the reference table may be updated based on one or current offsets determined in the act 606. In one embodiment, a configurable adaption speed parameter may be utilized to adjust the one or more entries. For example, if the adaption speed parameter is configured at 100% speed (e.g., a multiplier of 1.0), the one or more entries may be updated with values equal to the one or more current offsets determined in the act 606. In other examples, a speed less than 100% may result in an incremental change in the one or more entries. In these examples, only a fraction of the difference between a current offset and an entry in the reference table may be added or subtracted from an entry. For instance, if +1 amp is the difference between a current offset and an entry in the reference table, a 25% speed (e.g., 0.25) would result in 0.25 amps being added to the entry in the reference table. Likewise, a −1 amp difference between a current offset and an entry in the reference table, at 25% speed, would result in 0.25 amps being subtracted from the entry in the reference table. As discussed above with reference to FIG. 4, it may be advantageous to use a speed of less than 100% to allow for gradual changes to entries in the reference table, and thus, a slower reshaping of an input current waveform.

In act 610, target current values are determined by summing each entry of the reference table with a corresponding current value of the sinusoidal reference waveform. In one embodiment, the power device may then draw input current in a manner which results in the input current waveform being substantially identical (or similar) to the grid voltage waveform. In one embodiment, the current waveform may be progressively reshaped over several periods (e.g., as governed by the adaption speed parameter). In other embodiments, a weighting parameter (gain) may be applied to the target current values to increase input current adjustments (up or down). In these embodiments, the weighting parameter provides additional functionality in order to suppress harmonics more efficiently and with finer granularity.

In act 612, the power device draws current in accordance with the target current values determined in the act 610. In one embodiment, the power device draws a different target current value at each interval of the input current waveform. For example, if the power device is configured to sample the grid voltage waveform 64 times per cycle, such as in the act 604, the power device will reshape its input current waveform using an identical number of intervals. In still other embodiments, the target current values may be passed through an inductive filter, such as the inductive filter 500 of FIG. 5, to compensate for a large power device having inductive behavior.

As discussed above, one or more power devices, such as the plurality of devices 210 of FIG. 2, may be configured to determine and suppress voltage distortion of the power grid through reshaping of input current waveforms to substantially match a grid voltage waveform. Some aspects and embodiments discussed herein include small power-consumers, such as the UPS 100 of FIG. 1, actively contributing to stabilization of the grid waveform in a decentralized manner. As a result, the overall grid infrastructure may be improved and benefits realized. For example, improvements may include voltage distortion suppression, decreased potential of UPSs operating in battery mode, and an increase in the power factor of a combined power grid.

Figure 7:
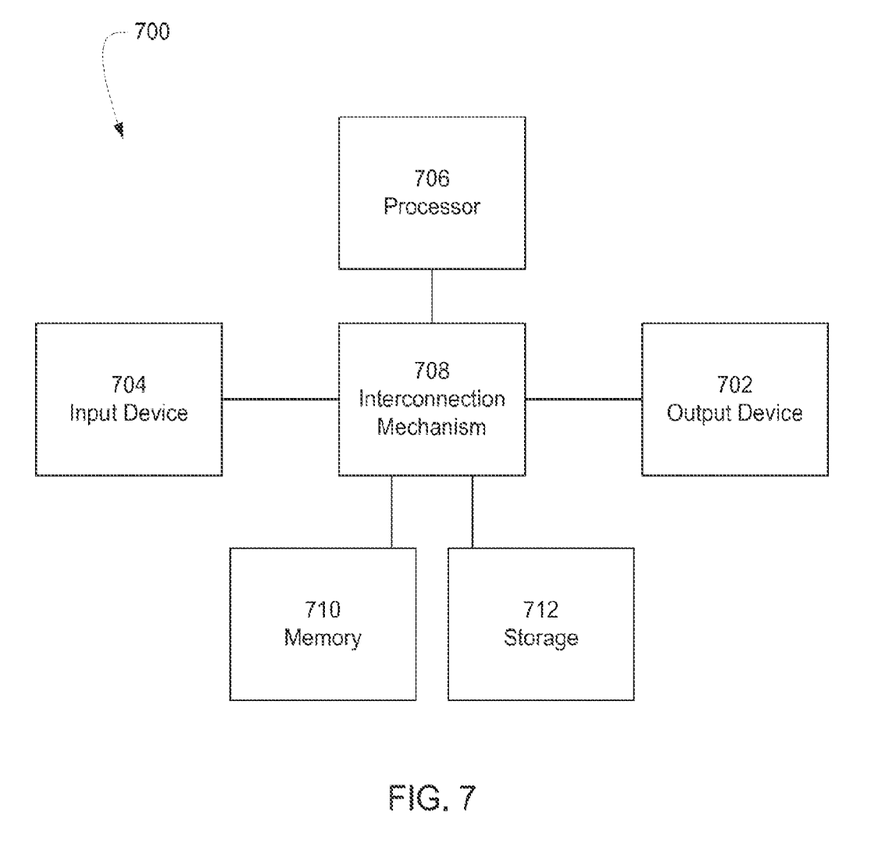
FIG. 7 is a block diagram of one example of a computer system that may be used in or coupled to power devices in accordance with some embodiments.

FIG. 7 illustrates an example of a block diagram of computing components forming a system 700 which may be configured to implement one or more aspects disclosed herein. For example, the computer system 700 may be communicatively coupled to a UPS or included within a UPS and configured to perform an input current waveform shaping process as described above with reference to FIG. 6.

The system 700 may include for example a general-purpose computing platform such as those based on Intel PENTIUM-type processor, Motorola PowerPC, Sun Ultra-SPARC, Texas Instruments-DSP, Hewlett-Packard PA-RISC processors, or any other type of processor. System 700 may include specially-programmed, special-purpose hardware, for example, an application-specific integrated circuit (ASIC). Various aspects of the present disclosure may be implemented as specialized software executing on the system 700 such as that shown in FIG. 7.

The system 700 may include a processor/ASIC 706 connected to one or more memory devices 710, such as a disk drive, memory, flash memory or other device for storing data. Memory 710 may be used for storing programs and data during operation of the system 700. Components of the computer system 700 may be coupled by an interconnection mechanism 708, which may include one or more buses (e.g., between components that are integrated within a same machine) and/or a network (e.g., between components that reside on separate machines). The interconnection mechanism 708 enables communications (e.g., data, instructions) to be exchanged between components of the system 700. Further, in some embodiments the interconnection mechanism 708 may be disconnected during servicing of a PDU.

The system 700 also includes one or more input devices 704, which may include for example, a keyboard or a touch screen. An input device may be used for example to configure the measurement system or to provide input parameters. The system 700 includes one or more output devices 702, which may include for example a display. In addition, the computer system 700 may contain one or more interfaces (not shown) that may connect the computer system 700 to a communication network, in addition or as an alternative to the interconnection mechanism 708.

The system 700 may include a storage system 712, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 710 that allows for faster access to the information by the processor/ASIC than does the medium. This memory 710 may be a volatile, random access memory such as a dynamic random access memory (DRAM) or static memory (SRAM). It may be located in storage system 712 or in memory system 710. The processor 706 may manipulate the data within the integrated circuit memory 710 and then copy the data to the storage 712 after processing is completed. A variety of mechanisms are known for managing data movement between storage 712 and the integrated circuit memory element 710, and the disclosure is not limited thereto. The disclosure is not limited to a particular memory system 710 or a storage system 712.

The system 700 may include a general-purpose computer platform that is programmable using a high-level computer programming language. The system 700 may be also implemented using specially programmed, special purpose hardware, e.g. an ASIC. The system 700 may include a processor 706, which may be a commercially available processor such as the well-known Pentium class processor available from the Intel Corporation. Many other processors are available. The processor 706 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used. Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A power device comprising:
    an input configured to receive input power;
    a controller coupled to the input and configured to:
        receive at least one sample of a voltage waveform of the input power;

compare the at least one sample of the voltage waveform with a sinusoidal reference waveform to determine a plurality of offset values;

compare each offset value of the plurality of offset values with a corresponding entry in a reference table; and shape an input current waveform of the power device to be substantially similar to the voltage waveform based on the comparing of the plurality of offset values to the reference table.

2. The power device of claim 1, wherein each offset value of the plurality of offset values includes a difference between a respective sample of the voltage waveform and a corresponding sample of the sinusoidal reference waveform, and wherein the controller is further configured to:

update at least one entry in the reference table based on an offset value.

3. The power device of claim 2, wherein at least a fraction of the offset value is added to the at least one entry based on a configurable adaption speed parameter.

4. The power device of claim 3, wherein the controller is further configured to:

determine a plurality of target current values based on summing each entry in the reference table with a corresponding sample of the sinusoidal reference waveform.

5. The power device of claim 4, wherein each target current value of the plurality of target current values is adjusted based on a configurable weighting parameter.

6. The power device of claim 4, wherein the controller includes an inductive filter, and wherein the controller is further configured to adjust each target current value of the plurality of target current values using the inductive filter.

7. The power device of claim 4, wherein the power device is configured to draw each target current of the plurality of target current values over a first period of the input power.

8. The power device of claim 7, wherein at least one target current value of the plurality of target current values is adjusted based on the configurable adaption speed parameter between the first period and a second period of the input power.

9. The power device of claim 1, wherein the power device comprises an uninterruptable power supply.

10. A method for shaping an input current waveform of a power device, the method comprising:

receiving at least one sample of a voltage waveform of an input power;

comparing the at least one sample of the voltage waveform with a sinusoidal reference waveform to determine a plurality of offset values;

comparing each offset value of the plurality of offset values to a corresponding entry in a reference table; and shaping the input current waveform to be substantially similar to the voltage waveform based on the comparing of the plurality of offset values to the reference table.

11. The method of claim 10, further comprising:

updating at least one entry in the reference table based on an offset value.

12. The method of claim 11, wherein updating at least one entry in the reference table based on the offset value includes adding at least a fraction of the offset value to the at least one entry based on a configurable adaption speed parameter.

13. The method of claim 11, further comprising determining a plurality of target current values based on summing each entry in the reference table with a corresponding sample of the sinusoidal reference waveform.

14. The power device of claim 13, wherein determining the plurality of target current values based on summing each entry in the reference table with the corresponding sample of the sinusoidal reference waveform further includes adjusting each target current value of the plurality of target current values based on a configurable weighting parameter.

15. The method of claim 14, wherein determining the plurality of target current values based on summing each entry in the reference table with the corresponding sample of the sinusoidal reference waveform further includes filtering each target current value of the plurality of target current values using an inductive filter.

16. The method of claim 14, wherein shaping the input current waveform to be substantially similar to the voltage waveform based on the plurality of offset values further includes drawing each target current of the plurality of target current values over a period of the input power.

17. A power device comprising:

an input configured to receive input power;

an output configured to provide output power; and means for progressively shaping an input current waveform of the power device to be substantially similar to a voltage waveform of the input power over at least two periods of the input power based on a configurable adaption speed parameter.

18. The power device of claim 17, wherein the means for shaping an input current waveform of the power device includes an inductive filter.

19. The power device of claim 17, wherein the means is configured to shape the input current based on a configurable weighting parameter.

* * * * *